S. H. Loring,
Hose Coupling,
Nº 58,850. Patented Oct. 16, 1866.
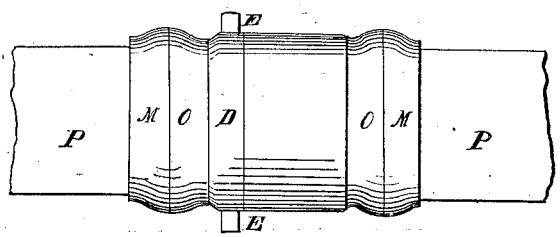
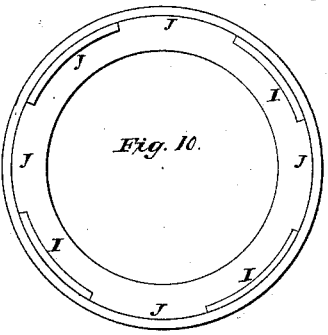
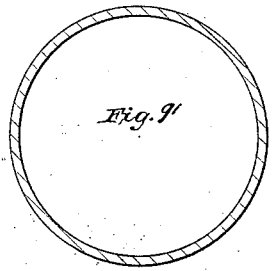
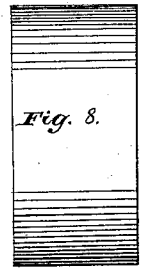
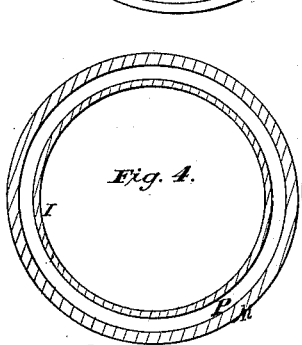
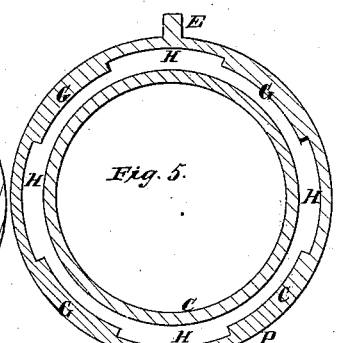
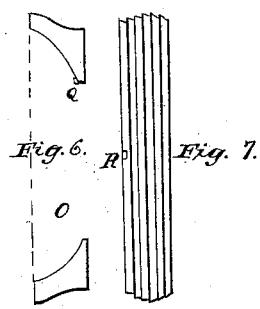
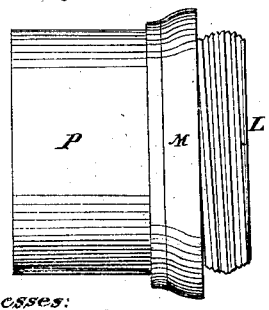
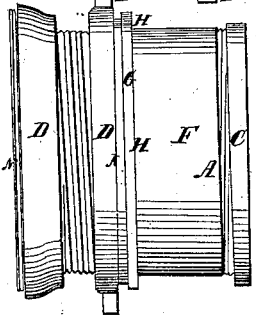
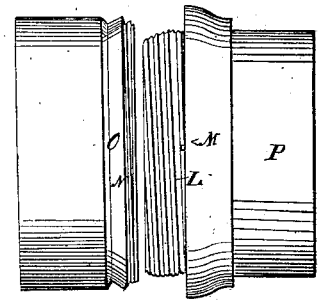
Witnesses:
James H. Barker
Geo. F. Towle
Inventor:
Silas H. Loring

UNITED STATES PATENT OFFICE.

SILAS H. LORING, OF LAWRENCE, MASSACHUSETTS.

IMPROVED HOSE-COUPLING.

Specification forming part of Letters Patent No. 58,858, dated October 16, 1866.

*To all whom it may concern:*

Be it known that I, SILAS H. LORING, of Lawrence, in the county of Essex and Commonwealth of Massachusetts, have invented a new and Improved Hose or Pipe Coupling; and I do hereby declare that the following is a full and exact description thereof, reference being had to the accompanying drawings, and to the letters of reference marked thereon.

Figures 1 and 2 represent the two hollow cylinders, they being the two parts of the coupling. Fig. 3 represents the mode of attaching the hose to the coupling. Fig. 4 represents a section, showing the manner of connecting the hose. Fig. 5 represents a section of the band D, showing knobs E and slots and dogs G, and also the groove H, to receive the dogs and slots on the interior surface of Fig. 2. Fig. 6 represents an interior view of cup to receive the end of the hose. Fig. 7 represents the oval ring used to press into the hose. Fig. 8 represents side view of expansion-packing. Fig. 9 represents a section of expansion-packing. Fig. 10 represents the slots and dogs in the end rim or flange of Fig. 2. Fig. 11 represents the coupling when put together.

To enable others skilled in the art to make and use my invention, I will proceed to describe its construction and operation.

I first take two hollow cylinders, Figs. 1 and 2, and upon the outside or convex surface of the hollow cylinder Fig. 1 I cut the threads of a screw at A, to receive the threads of the female screw cut on the interior or concave surface of the rim C. I then cut the threads B to receive the female screw cut on the concave surface of the band D.

The band D is made to be turned or screwed on or off the threads B by means of spanner-wrench, which grasps the knobs E.

The expansion-packing (see Figs. 8 and 9) occupies the place on the hollow cylinder Fig. 1 marked F, and is a band of expansive material, as rubber or cork, and is placed on the convex surface of the cylinder Fig. 1, and fills the space between the rim C and the band D, (the band D being screwed up to its shoulder.) I then screw up the rim C tight to its shoulder. The packing will then be confined between the rim C and the band D. Upon one end of the band D is an elevated rim with slots, as see G, and dogs, as see H, and see Figs. 1 and 5. These slots G are made to receive the dogs I on a rim in the inside or concave surface of the cylinder Fig. 2, as see also Fig. 10, and the dogs H to pass through the slots J in the said rim in Figs. 2 and 10.

The slots and dogs in the cylinder Fig. 2 are on a narrow rim on the inside of Fig. 2, and at the end of Fig. 2 nearest to Fig. 1 said rim is just thick enough to occupy the space K in the band D after the dogs of the one have passed through the slots of the other; and when these dogs and slots have passed each other the hollow cylinders Figs. 1 and 2 are turned a little in opposite directions, the dogs occupying the space K in the band D. The dogs of cylinder Fig. 2 will come behind the dogs on band D of cylinder Fig. 1, and the two cylinders, Figs. 1 and 2, will be firmly attached to each other.

Now, when the hollow cylinder Fig. 2 is slipped onto the cylinder, Fig. 1, and made fast by the dogs, then, by the use of the spanner-wrench, unscrew the band D. By so doing the band D will push the packing against the rim C, and as the rim C will keep the packing from slipping off the cylinder the packing must therefore swell or expand, so as to fill cylinder Fig. 2, and make the connection water-tight.

In order to connect the hose with the coupling I take the oval ring L, cut with grooves on its convex surface, the grooves pointing one way. I then press the ring into the inside of the hose, and push it in the smoothest way of the grooves, and, when in, the friction of the grooves will prevent it from slipping out. I then have a collar, M, to pass over the hose P and oval ring L, with a female screw cut on its interior surface to screw onto the threads N cut on the end of the coupling.

The ends of the coupling at O are made on its interior surface in a cup form, as see Fig. 6, to receive the hose at a shoulder to make it perfectly tight.

At the shoulder in the interior of the end of coupling O is a small knob, Q, (see Fig. 6,) to receive a slot, B, in the oval ring. (See Fig. 7.)

I claim—

The expansion-packing, Figs. 8 and 9, in combination with the dogs H and slots G in band D of Fig. 1, and the dogs I and slots J of Fig. 2, with the oval ring L and collar M, for the purposes herein set forth and described.

SILAS H. LORING. [L. S.]

Witnesses:
 JAMES K. BARKER,
 GEO. F. TOWLE.